United States Patent
Wagner et al.

(10) Patent No.: US 6,300,967 B1
(45) Date of Patent: Oct. 9, 2001

(54) METHOD AND APPARATUS FOR PROVIDING FEEDBACK WHILE SCROLLING

(75) Inventors: Annette Wagner, Los Altos; Osana Tishkova, Palo Alto; Michael Arent, Albany; Richard Berlin, Fremont; Fazeel Mufti, San Francisco, all of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/557,134

(22) Filed: Apr. 25, 2000

Related U.S. Application Data

(63) Continuation of application No. 09/108,067, filed on Jun. 30, 1998, now Pat. No. 6,061,063.

(51) Int. Cl.⁷ .................................................. G09G 5/00
(52) U.S. Cl. .............................................. 345/784; 345/787
(58) Field of Search .................................. 345/341, 342, 345/346, 347, 974, 973, 967, 334; 707/517, 518

(56) References Cited

U.S. PATENT DOCUMENTS

| | | | |
|---|---|---|---|
| 4,225,943 | * | 9/1980 | Busch .................................. 707/521 |
| 5,786,819 | * | 7/1998 | Weiser et al. ........................ 345/354 |
| 5,896,132 | * | 4/1999 | Berstis et al. ........................ 345/341 |
| 5,953,735 | * | 9/1999 | Forcier ................................. 707/541 |
| 6,014,140 | * | 1/2000 | Strand ................................... 345/341 |
| 6,016,488 | * | 1/2000 | Bosworth et al. ....................... 707/4 |

\* cited by examiner

Primary Examiner—Raymond J. Bayerl
Assistant Examiner—Tadesse Hailu
(74) Attorney, Agent, or Firm—The Hecker Law Group

(57) ABSTRACT

The present invention comprises a method for providing feedback to the user of a graphical user interface using visual and operational clues. In an embodiment of the invention, the user is provided visual clues that inform the user in what direction the display area can be scrolled. The display area may contain a list, a text box, a pop-up menu or any kind of data. Operational clues help the user determine what actions move the list and what actions do not move the list. The invention can be implemented in the form of a list. A list is comprised of one or more fields. At the top of the list and at the bottom of the list is a blank space that functions as one of the visual clues. The purpose of the blank space is to inform the user they are at the top of the list and cannot scroll any further up or that they are at the bottom of the list and cannot scroll any further down. Another form of visual clue is provided through the use of partially visible fields. Partially visible fields help the user know in which direction the list can be scrolled by indicating to the user that additional fields are present beyond the partially visible one.

9 Claims, 15 Drawing Sheets

"PRIOR ART"

METHOD AND APPARATUS FOR PROVIDING FEEDBACK WHILE SCROLLING

This application is a continuation of prior application Ser. No. 09/108,067 filed Jun. 30, 1998 U.S. Pat No. 6,061,063.

Portions of the disclosure of this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever. Sun, Sun Microsystems, the Sun logo, Solaris, "Write Once, Run Anywhere", Java, JavaOS, JavaStation, HotJava Views and all Java-based trademarks and logos are trademarks or registered trademarks of Sun Microsystems, Inc. in the United States and other countries.

BACKGROUND OF THE INVENTION

The present invention relates to a method and apparatus for providing visual and operational feedback to a user of displayed data.

One use of computers is to allow a user to interact with data displayed on a computer display screen. The user may interact with the displayed data using a keyboard, a pointing device such as a "mouse", or by actually touching portions or regions of the display itself (via a touch screen). Unfortunately, the use or manipulation of data can be confusing or difficult to users that do not have experience with computer systems. Current display paradigms lack adequate cues and feedback to provide a satisfactory computing experience to the novice or infrequent user. As a result, a user may become frustrated and/or unable to interact with displayed data in a desired manner. Problems and disadvantages of interacting with display data can be understood by reviewing current approaches to the display and manipulation of data.

The means by which a computer user communicates with a computer is referred to as a "user interface." A user interface typically consists of a computer display screen and one or more input devices (keyboard, mouse, or touch screen, for example), as well as the computer software that interprets input and provides images displayed on the computer display. Commonly, data and information is displayed in one or more "windows" on a display, where a window is a rectangular region.

Sometimes the data to be displayed to the user, for example a graphic representation of a list or a text document, is too large to be shown on the display area in its entirety. When this occurs the display area can often be "scrolled" or "panned" to a new position relative to the displayed list or text such that the display area now shows portions the user was previously unable to see (and correspondingly, previously displayed portions may now no longer be displayed). The term scrolling is used herein to refer to both scrolling and panning. A problem with existing scrolling mechanisms is that people unfamiliar with computer interfaces often have trouble understanding how to operate them.

FIG. 1 illustrates an example of a prior art window with scroll bars. Window 100 shown in FIG. 1 is an interface for a word processing program. Window 100 features a vertical scroll bar 120 and a horizontal scroll bar 130 that allows the user to scroll the data of document displayed in document display region 110. The vertical scroll bar 120 allows the user to move the contents of document display region 110 up or down and the horizontal scroll bar 130 allows the user to move the contents of document display region 110 left or right.

There are several way to begin moving the contents of document display region 110. For example, the user can scroll the document in display region 110 up by activating the up arrow 121 with the mouse button. Activating the down arrow 122 scrolls the document display region 110 down. If the user clicks on the double down arrow 124 or the double up arrow 125 one time the document display region 110 moves all the way to the top or bottom. The double down arrow and double up arrow provide a way to jump immediately to the start or end of a document regardless of what portion of the document the user is currently viewing.

The user can also use a mouse to drag the square box 123 up or down. This box is sometimes referred to as an "elevator" or "thumb". Moving square box 123 is another way to move the document display region. When the user moves square box 123 the page number corresponding to the relative position of the square box in scroll bar 120 is displayed at the bottom left of interface 100 and the contents of that page are shown in the document display region 110. If the user moves square box 133 the document display region moves either left or right. What direction the document display region 110 moves is dependent upon which direction the user moves square box 133 or square box 123.

If the user places the mouse cursor anywhere over scroll bar 120 or scroll bar 130 and clicks the mouse button, the document display region also moves. What direction the document display region moves depends upon where the user clicks the mouse cursor. If the mouse cursor is placed below square box 123, the document display region moves down when the mouse button is clicked. If the mouse cursor is placed above the square box 123, the document display region moves up when the mouse button is clicked. If the user places the mouse button on scroll bar 130, the document display region moves either left or right when the mouse button is clicked. The amount the document display region moves is proportionate to the distance the mouse cursor is from the square box 123.

Operating such a scrolling mechanism is complex for people who are unfamiliar with computer interfaces. Therefore, such users are in need of a scrolling mechanism that consistently provides instructional feedback. The present invention provides the user with visual clues in a manner that allows for efficient scrolling.

SUMMARY OF THE INVENTION

The present invention comprises a method for providing feedback to the user of a graphical user interface using visual and operational clues. In an embodiment of the invention, the user is provided visual clues that inform the user in what direction the display area can be scrolled. The display area may contain a list, a text box, a pop-up menu or any kind of data. Operational clues help the user determine what actions move the list and what actions do not move the list. Examples of visual clues and operational clues are provided.

In one embodiment the invention is implemented in the form of a list. A list has one or more fields. Each field is assigned a width and a height. At the top of the list and at the bottom of the list is a blank space that functions as one of the visual clues. The purpose of the blank space is to inform the user they are seeing the top of the list and cannot scroll any further up or that they are seeing the bottom of the list and cannot scroll any further down.

The user is also provided feedback by the control buttons that accompany the list and are used to move the list up or down. The up button moves the list up and the down button moves the list down. When the list is scrolled to the top the up button is disabled and when the list is scrolled to the bottom the down button is disabled. If the list is scrolled anywhere in between the top and the bottom then both the up button and the down button are enabled. When a control button is disabled it does not respond to input from the user. The disabled buttons are drawn differently, to distinguish them from active buttons. Disabling buttons that cannot be used and enabling buttons that can be used is another way of using visual feedback to inform the user whether the list can be scrolled.

If the user tries to use a disabled control button the list does not scroll. Preventing the list from scrolling when a control button is disabled is a form of operational feedback.

Another form of visual clue is provided through the use of partially visible fields. Partially visible fields help the user know in which direction the list can be scrolled. Partially visible fields indicate to the user that additional fields are present beyond the partially visible one.

In a second embodiment of the invention the list is contained in a pop-up menu. When a user activates the pop-up menu button a list comprised of fields is displayed. The pop-up menu provides the same visual and operational clues discussed above.

In a third embodiment of the invention the display area consists of a text box. A text box is separated into lines instead of fields. The user can enter and remove text from the text box. To provide the user with information about how to navigate around the text box the invention provides the same visual and operational clues discussed above.

Thus, the invention provides visual and operational clues to inform the user what portion of the display area is currently viewed, and in which direction the display can be scrolled.

BRIEF DESCRIPTION OF THE DRAWINGS

FIG. 6 illustrates an embodiment of the invention implemented in the form of a text box that is scrolled all the way to the top.

FIG. 7 illustrates an embodiment of the invention implemented in the form of a text box that is scrolled somewhere in between the top and the bottom.

DETAILED DESCRIPTION

A method for providing visual and operational clues to a user of displayed data is described. In the following description, numerous specific details are described in order to provide a more thorough understanding of the invention. It will be apparent, however, to one skilled in the art, that the present invention may be practiced without these specific details. In other instances, well known features have not been described so as to not obscure the present invention.

The present invention can be used in any application where data is to be displayed. The invention can be used, for example, in any computer system, television menu system, telephone menu system, processor driven kiosk, internet telephone display, internet television system, video game menu display, video recorder display, or any other displayed data environment. One embodiment of the invention is useful when there is limited processing power available, limited memory, and an expected user base of novice or infrequent computer users.

List of Choices

Figure 3:
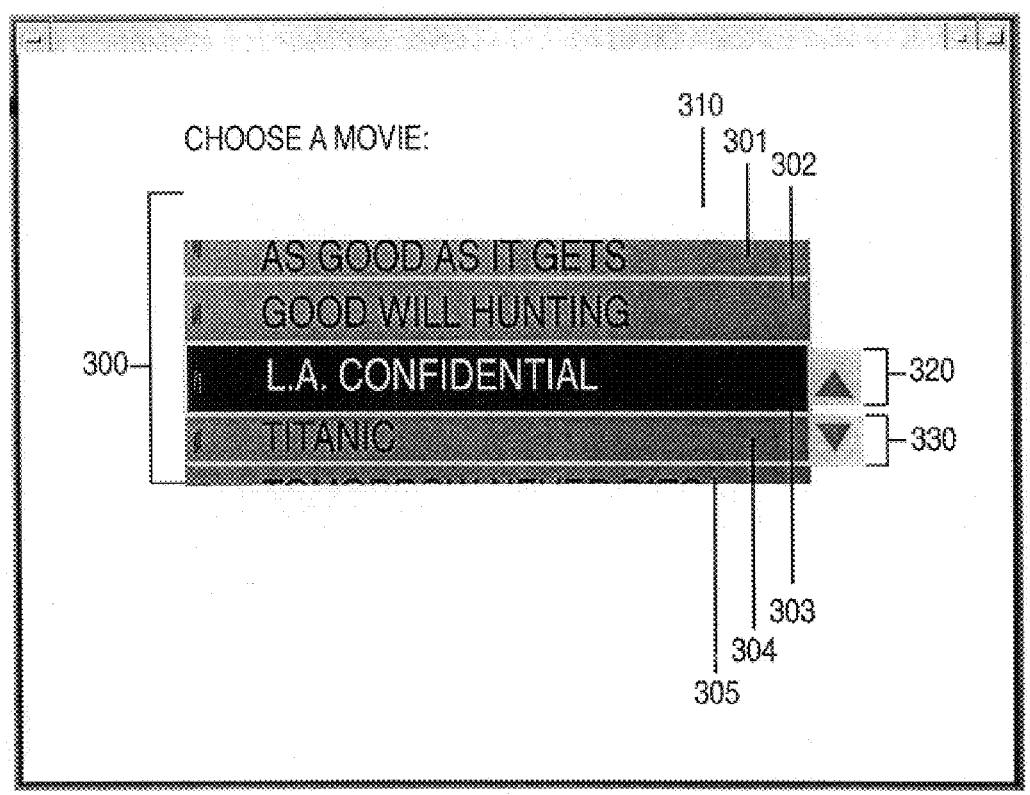
FIG. 3 illustrates an embodiment of the invention implemented in the form of a list that is scrolled all the way to the top.
Figure 4:
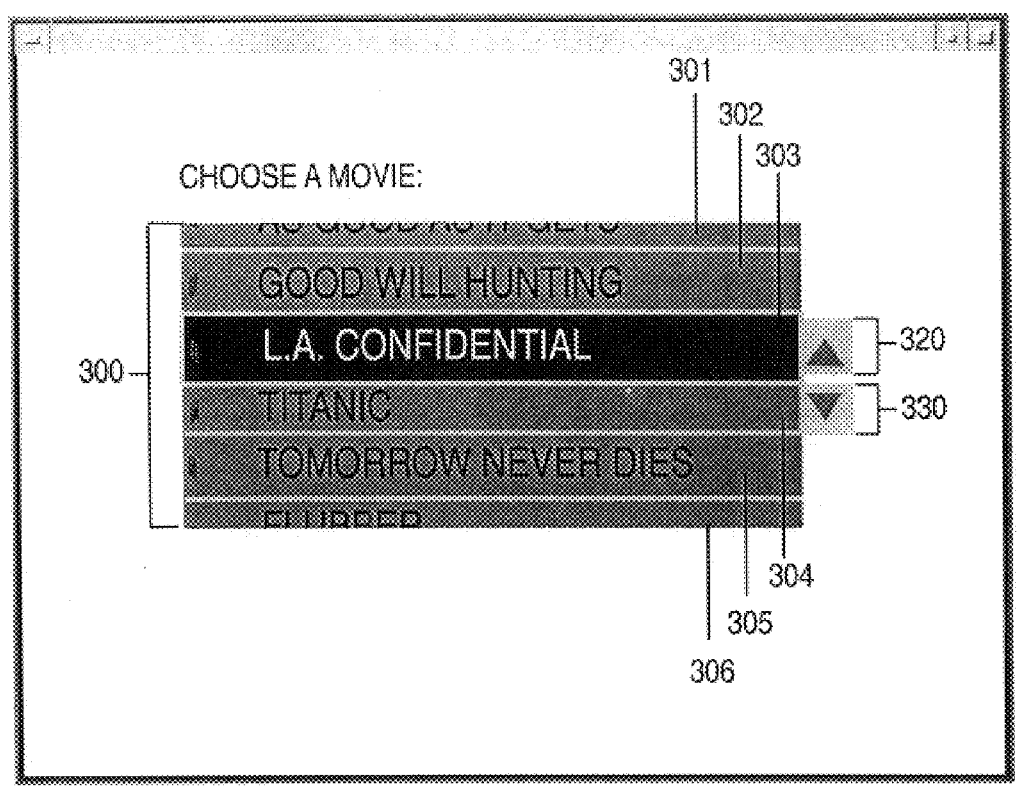
FIG. 4 illustrates an embodiment of the invention implemented in the form of a list that is scrolled somewhere in between the top and the bottom.
Figure 5:
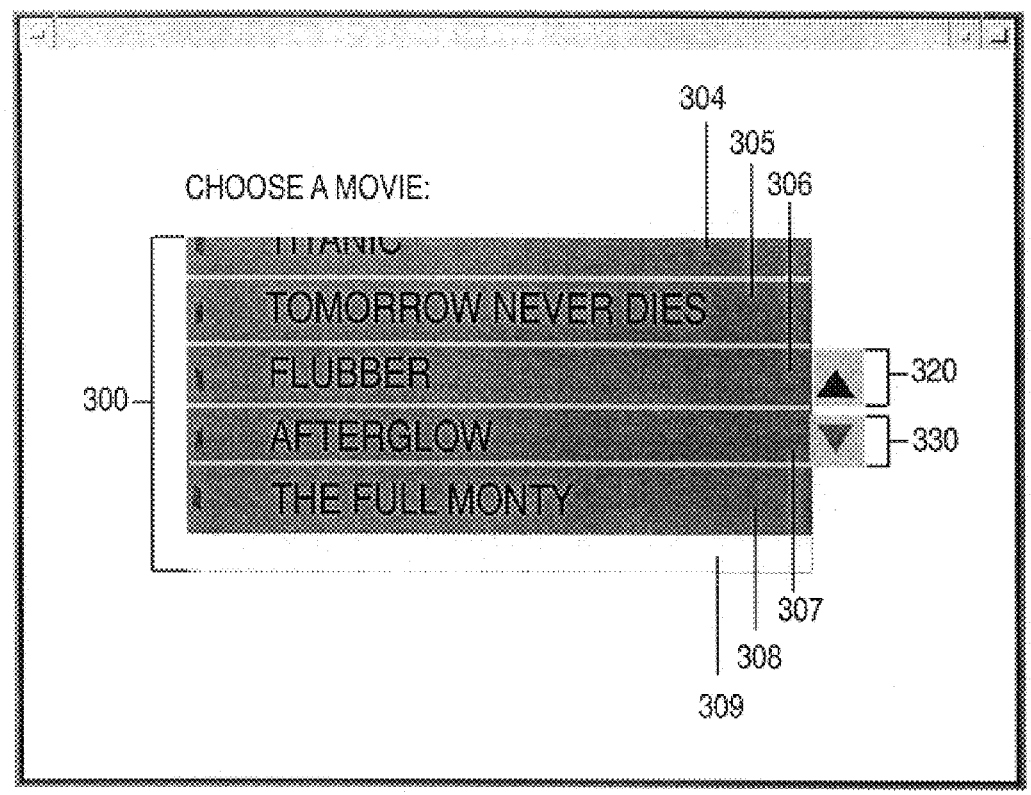
FIG. 5 illustrates an embodiment of the invention implemented in the form of a list that is scrolled all the way to the bottom.

FIGS. 3, 4, and 5 illustrate the operation of one embodiment of the present invention. The embodiment shown is in the form of a list presenting a series of choices (in this case movie titles). The list can be scrolled up and down because it contains more movie titles than it is possible to display at any one time.

When a user wants to select a movie, the user scrolls up and down the list to find the movie they wish. Scrolling is accomplished by clicking on the pair of control buttons that sit next to the list. One of the control buttons moves the list up and the other moves the list down.

The embodiments shown in FIGS. 3, 4, and 5 provide the user with a number of visual clues and operational clues. These clues help the user determine whether or not a list is currently scrollable, and in what direction the list can be scrolled. How the list appears to the user depends upon which part of the list is being shown. The list appears different to a user when the list is scrolled to the top of the list than it looks to a user when the list is scrolled to the bottom of the list. Likewise, the list appears different to a user when the list is scrolled to somewhere in between the top and the bottom. The purpose of having different appearances for the various positions the list can be in is to continually provide the user with information about how to use the list.

Referring now to FIG. 3, the list is shown scrolled to the top. When the list is in this position it is not possible for the user to scroll the list up. In order to communicate this fact to the user, the invention provides the user with visual and operational clues. Each visual clue informs the user which direction the list can scroll. Operational clues help the user determine what actions can scroll the list.

In FIG. 3 the list 300 is separated into a number of fields 301–305. Each field contains a movie title. At the top of the list is a blank space 310 that is approximately half the height of a field. This blank space 310 is one of the visual clues. The blank space exists to inform the user they are seeing the top of the list and cannot scroll any further up. FIG. 3 also shows a pair of control buttons on the right hand side of the list. There is an up button 320 and a down button 330. The purpose of the control buttons is to allow the user to move the list 300. If the user clicks on the up button 320, the list moves up. If the user clicks on the down button 330, the list moves down.

When the list is scrolled to the top the up button 320 is disabled. The up button 320 is drawn "disabled" in order to provide another visual clue to the user. The up button 320 can also provide the user with an operational clue. If the user tries to use the disabled up button 320, the list does not scroll. This type of behavior is an operational clue. Operational clues help the user determine what actions scroll the list.

Partially visible fields also function as visual clues in the invention. Partially visible fields help the user know in which direction the list is capable of scrolling. FIG. 3 shows a partially visible field 305 at the bottom of the list. Partially visible fields indicate to the user that additional fields are present beyond the partially visible one. In this case the user knows that there is at least one additional field below.

Thus, there are two visual clues provided to show the user that they are at the top of the list and a third visual clue to show the user what direction the list can scroll. The first visual clue is the blank space 310 shown at the top of the list. A second visual clue is that the up button 320 is drawn "disabled". The third visual clue is the use of a partially visible field 305. Partially visible fields indicate to the user that additional fields exists beyond the partially visible one. The list also provides operational clues to help the user determine what type of actions scroll the list. Disabling control buttons that currently do not scroll the list is one example of an operational clue.

When the user clicks on one of the control buttons to scroll downward, the list continues to provide visual clues. Referring now to FIG. 4, the list 300 is shown as it appears when the user clicks the down button 330 once. This moves the entire list by one field so that field 301, formerly the highest visible field, now becomes partially visible at the top of the display area. What used to be the bottom field in FIG. 3, field 305, is no longer the bottom field. Field 305 is now fully visible and a new field, field 306, is now partially visible at the bottom of the list.

The partially visible fields at the top and bottom of the screen function as visual clues. The partially visible fields tell the user that more fields are available above and below the visible ones. Also, both the up button 320 and down button 330 are now enabled. This tells the user it is possible to move the list either up or down. An operational clue to the user is the fact that if the user touches either the up or down button, the list moves either up or down, respectively. Thus, the list continually provides the user with visual clues that help the user determine the proper direction to scroll.

FIG. 5 illustrates how the list appears when it is scrolled all the way to the bottom. When the list is in this position it can no longer be scrolled down, but can only be scrolled up. In an effort to give the user more feedback about the status of the list, the list continues to provide both visual clues and operational clues.

At the bottom of the list is another blank space 309. This blank space is another visual clue. The blank space exists to inform the user that the user is seeing the bottom of the list and cannot scroll any further down. When the list is scrolled to the bottom, pressing the down button 330 does not move he list. When the list is in this position the down button 330 is drawn "disabled". This provides another visual clue for the user. If the user tries to use the disabled down button, the list does not scroll. The fact that the list does not scroll, even if the user attempts to do so, is an operational clue. Also, the use of partially visible fields continues to provide the user with visual clues indicating which direction the list can be scrolled. Field 304 is an example of a partially visible field. Field 304 is partially visible so that it can communicate to the user that more fields are present above.

Thus, there are two visual clues provided to show the user they are at the bottom of the list and a third visual clue to show the user what direction the list can scroll. The first visual clue is the blank space shown at the bottom of the list. When the bottom of the list is reached, the down button is drawn "disabled". This is the second visual clue. The third visual clue is the partially visible field shown at the top of the list. Partially visible fields inform the user which direction the list can scrolled.

The embodiments shown in FIGS. 3, 4, and 5 are designed to provide the user with as much information as possible about whether or not the list can be scrolled, and in what direction the list can scroll. The visual clues change the appearance of the list when the user is viewing different portions of it. The operational clues provide the user with feedback when they attempt to perform an impermissible action.

Editable Text Field

Figure 6:
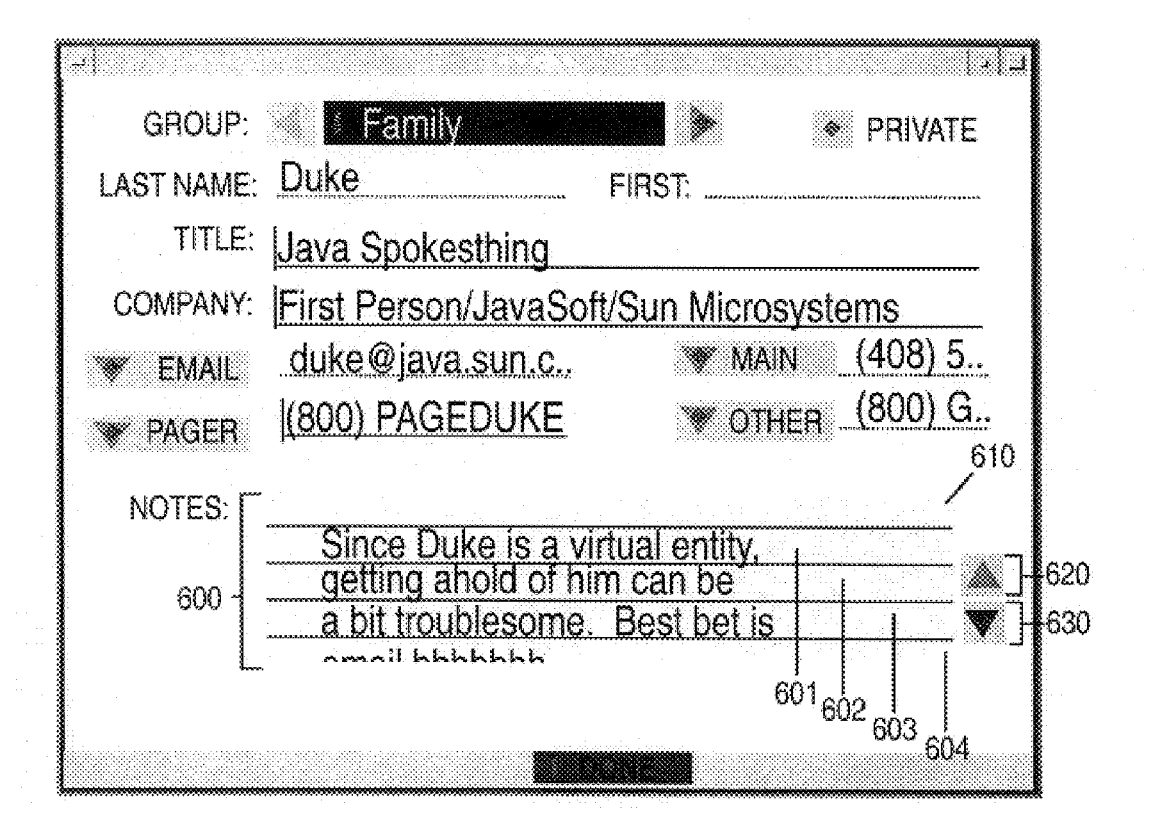
Figure 7:
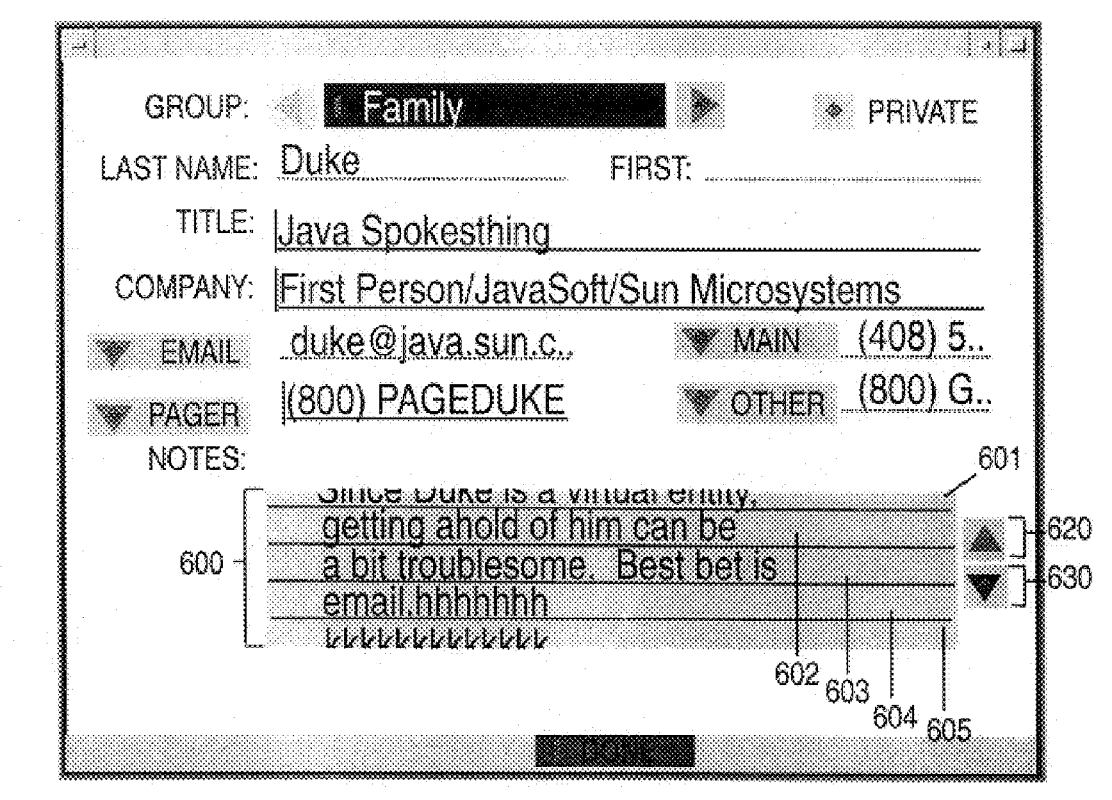
Figure 8:
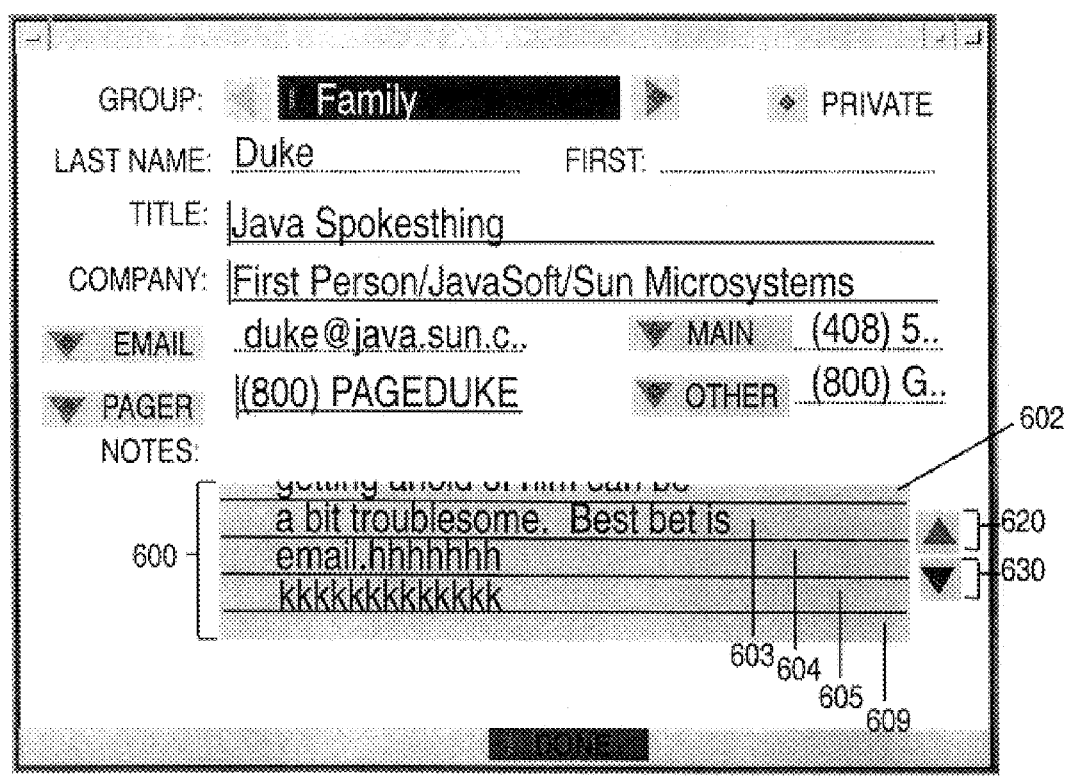
FIG. 8 illustrates an embodiment of the invention implemented in the form of a text box that is scrolled all the way to the bottom.

FIGS. 6, 7, and 8 illustrate another embodiment of the present invention. The embodiment is shown in the form of a text box 600. A text box 600 may contain a variable amount of text. By using the pair of control buttons located to the right of the text box 600, the user can scroll the text box 600 both up and down (because the text box 600 may contain more text than it is possible to display at any one time). Users can enter text anywhere in the text box 600. Text is entered by positioning the cursor (e.g. by touching a touch screen, by moving a cursor with a mouse and clicking) at the location in the text box 600 at which the user wishes the text to appear and then typing. Once the user begins typing text starts to appear inside the text box 600.

If the user enters enough text the visible portion of the text box 600 becomes full. When this occurs, the text box 600 scrolls up. If the user wants to view text that is above or below the currently visible text the user can scroll up or down using the control buttons located on the right hand side of the text box. The up button 620 moves the text box 600 up and the down button 630 moves the text box 600 down. The text box contains a number of visual and operational clues. These clues help the user determine when the text box 600 is scrollable, and in what direction the text box 600 can be scrolled.

FIG. 6 illustrates how the text box 600 appears when scrolled all the way to the top. When the text box 600 is scrolled to this position it cannot be scrolled up anymore. In FIG. 6 the text box 600 contains three completely visible lines of text, lines 601–603, and one partially visible line of text, line 604. Above the top line of text is a blank space 610. This blank space is one of the visual clues provided by the invention. The purpose of the blank space 610 is to inform the user they are at the top of the text box 600.

The control buttons shown to the right of the text box 600 also provide the user with feedback. When the text box 600 is scrolled to the top the up button 620 is drawn "disabled".

This provides another visual clue to the user. If the user tries to use the disabled up button 620, the text box 600 does not scroll. The text box 600 also contains partially visible lines. These partially visible lines provide the user with visual clues that indicate which direction the list can scroll. Line 604 is an example of a partially visible line. The purpose of having partially visible lines is to communicate to the user that more line are present above or below the visible lines.

FIG. 7 illustrates how the text box 600 appears when the user clicks the down button 630 one time. Doing this scrolls the text box 600 down a distance of one line and makes line 601 partially visible instead of fully visible. Line 604 is now fully visible instead of partially visible. A line that is not visible at all in FIG. 6, line 605, is now partially visible at the bottom of the text box 600. The partially visible lines that show at the top and bottom of the text box 600 indicate that text exists above and below the visible text. Also, the user can see that both the up button 620 and the down button 630 are enabled, telling the user it is possible to scroll the text box 600 up or down.

FIG. 8 illustrates how the text box 600 appears when the user scrolls all the way to the bottom. A blank space 609 exists below the last visible line of text to inform the user where the bottom of the text box 600 is. The control buttons shown to the right of the text box continue to provide the user with feedback. When the text box is scrolled to the bottom the down button 630 is drawn "disabled". If the user tries to use the disabled down button 630, the text box 600 does not scroll, Partially visible lines are also present at the top of the text box 600 to help show the user which direction the text box 600 can scroll.

Figure 9A:
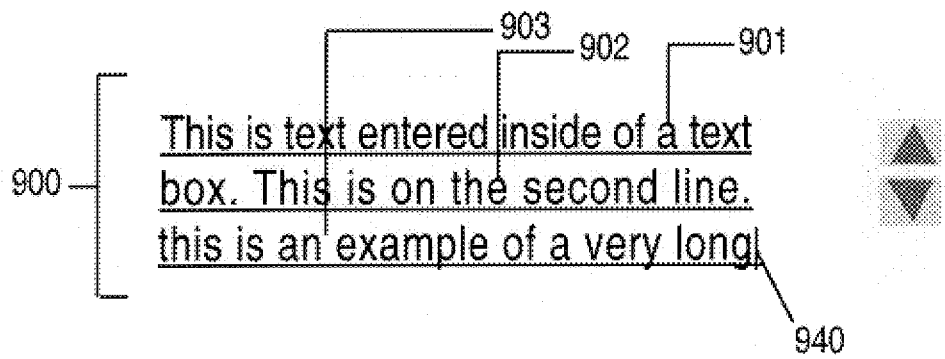
FIG. 9A illustrates where the cursor rests before the user fills the visible lines of the text box entirely with text.
Figure 9B:
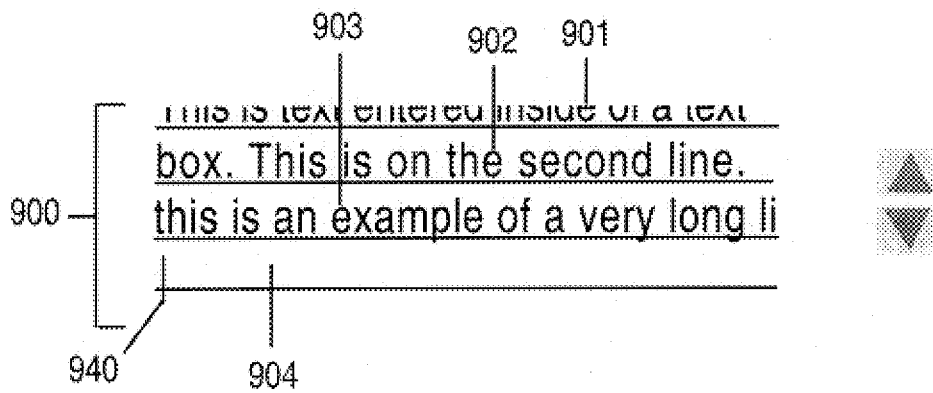
FIG. 9B illustrates where the cursor rests after the user fills the visible lines of the text box entirely with text and a new line appears.
Figure 9C:
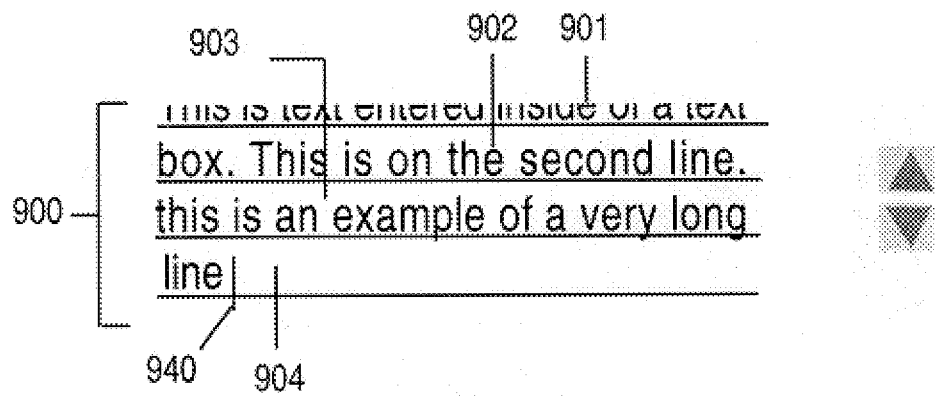
FIG. 9C illustrates where the cursor rests after the user types on the new text box line.

FIGS. 9A, 9B, and 9C illustrate how line wrapping occurs when the user fills the visible portion of the text box 900 entirely with text. FIG. 9A illustrates where the cursor rests before the user fills the visible lines of the text box entirely with text. FIG. 9B illustrates where the cursor rests after the user fills the visible lines of the text box entirely with text and a new line appears. FIG. 9C illustrates where the cursor rests after the user types on the new text box line.

Referring now to FIG. 9A, if the user enters enough text to fill the visible portion of the text box 900 a new line appears and the cursor wraps onto that new line. For example, if the user intends to enter the phrase "this is an example of a very long line of text" on line 903, but is only able to type a portion of that phrase before cursor 940 reaches the end of the line, then the text wraps to a new line 904 that appears at the bottom of the text box 900. FIG. 9B shows how the text box looks after a new line 904 appears. The cursor 940 wraps onto this new line 904 and the user can continue to enter more text on the new line 904.

In one embodiment of the invention text that cannot fully fit on the line is moved to the new line along with the cursor. FIGS. 9B and 9C illustrate how this appears to a user who reaches the end of line 903 in the middle of the word "line." In this embodiment the text wraps to a new line so that the word "line" is moved onto the new line 904 when the end of line 903 is reached. The invention continues to wrap to new lines as long as the user keeps entering text into the text box 900.

Figure 10:
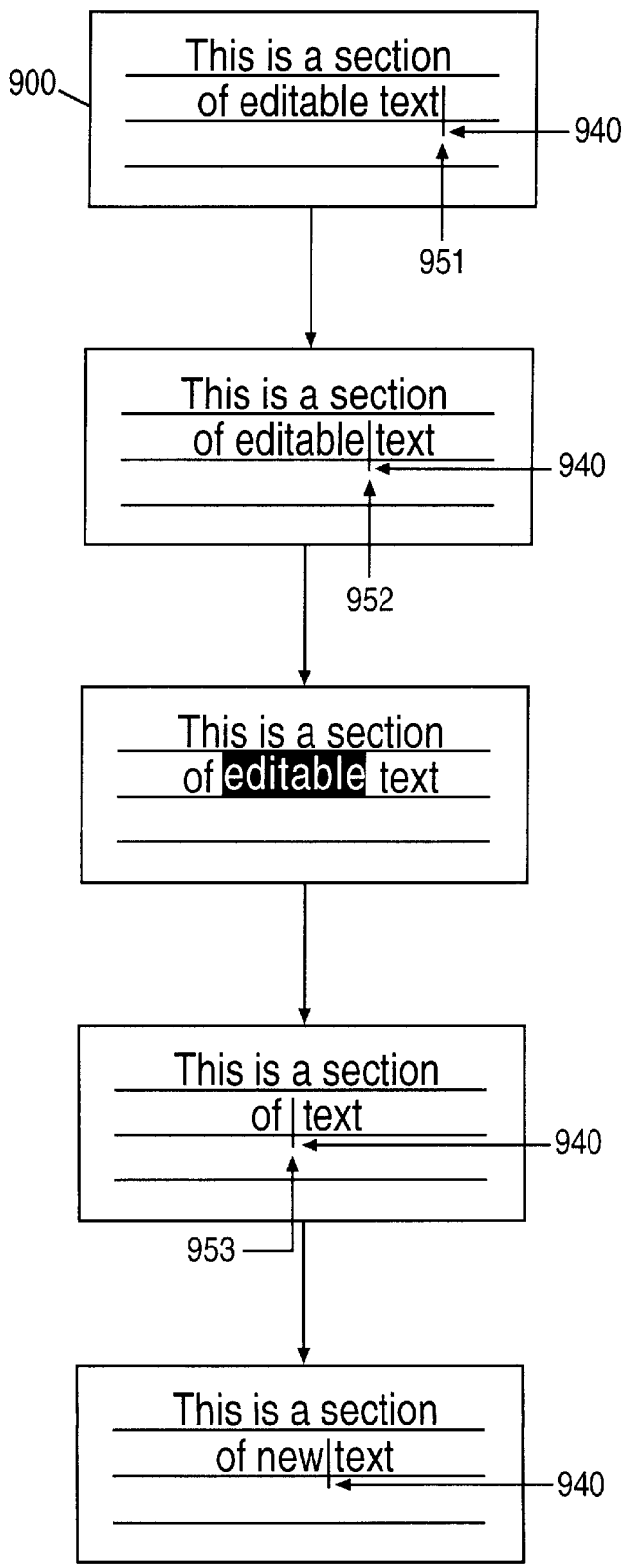
FIG. 10 illustrates how to edit text located inside the text box.

FIG. 10 illustrates how to edit text located inside the text box 900. The user may edit text by using the cursor 940 to indicate the desired editing location. For example, if the user has just typed the phrase "this is editable text" and then decides to remove the word "editable" from that phrase, the user begins by moving cursor 940 from location 951 to location 952. Once the cursor is at location 952 the user may remove the word "editable." In one embodiment of the invention, the user may accomplish this by hitting the delete key or the backspace key eight times. It is possible to remove the word "editable" by using any input device capable of positioning cursor 940 at the proper location. For example, the user might also choose to move the cursor by using the mouse, a touch screen, or some other input mechanism.

Removing an entire word or phrase in at least one key stroke is possible if the user highlights the portion of text they wish to remove. An example of how this appears is shown in FIG. 10. When the word the user wishes to remove is entirely deleted the cursor 940 is at location 953. Now the user can begin entering new text. FIG. 10 illustrates how the screen appears if the user enters the word "new" where the word "editable" used to be.

Pop-up Menu

FIGS. 11A through 11D illustrate an embodiment of the invention implemented in the form of a pop-up menu 1100. A pop-up menu 1100 is viewed by activating a pop-up button 1101. The pop-up menu 1100 and the pop-up button 1101 both provide visual clues to the user indicating their behavior. This helps inform the user what to expect when either the pop-up button 1101 or the pop-up menu 1100 is utilized.

To begin using the pop-up menu 1100 the user must first click on popup button 1101. The purpose of this is to indicate to the user that additional choices can be viewed by activating the pop-up button 1101.

Figure 11A:
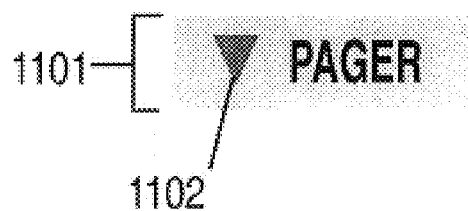
FIGS. 11A–11D illustrates an embodiment of the invention implemented in the form of a pop-up button and pop-up menu.
Figure 11B:
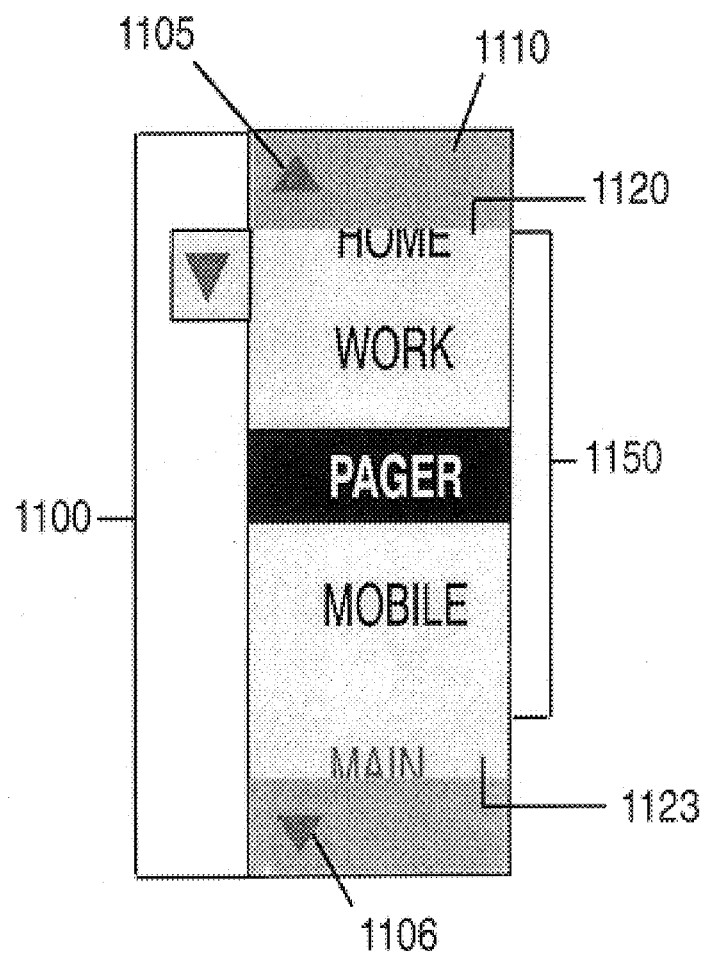

When the user clicks the pop-up button 1101 the pop-up menu 1100 appears. The pop-up menu 1100 contains a list 1150 of choices. Each choice is, referred to as a field. One of the fields in the list 1150 may be displayed on the pop-up button 1101. For example, if the list 1150 contains the fields "work", "pager", "mobile", "main", and "email" any one of those fields may be displayed on the face of the pop-up button 1101. In FIG. 11B the field named "pager" is used. The list 1150 may contain more fields than it is possible to display at one time. To view fields beyond the visible area the user can scroll up or down. To provide the user with information about how to navigate among the list 1150 the pop-up menu 1100 provides several visual clues. Different visual clues are provided at different stages of use.

For example, when the pop-up menu 1100 first appears arrows are visible at the top and bottom of the list 1150. The arrows are placed in space 1110 at the top or bottom of the list. In one embodiment of the invention the height of the blank space 1110 is dependent upon the height of the fields. The up arrow 1105 indicates to the user that more fields are available above the field currently at the top of the list. For example, the up arrow 1105 shown in FIG. 11B indicates that at least one more field is present above field 1120. The down arrow 1106 shows the user at least one more field is also present below field 1123.

Another indication that more fields are present above and below the currently visible fields is provided to the user by displaying partially visible fields. Field 1123 is an example of a partially visible field. Partially visible fields also show the user that at least one more field exists above or below the visible ones. If the user is looking at the list 1150 somewhere in between the top and the bottom, partially visible fields are at both the top and bottom.

Figures 11C, 11D:
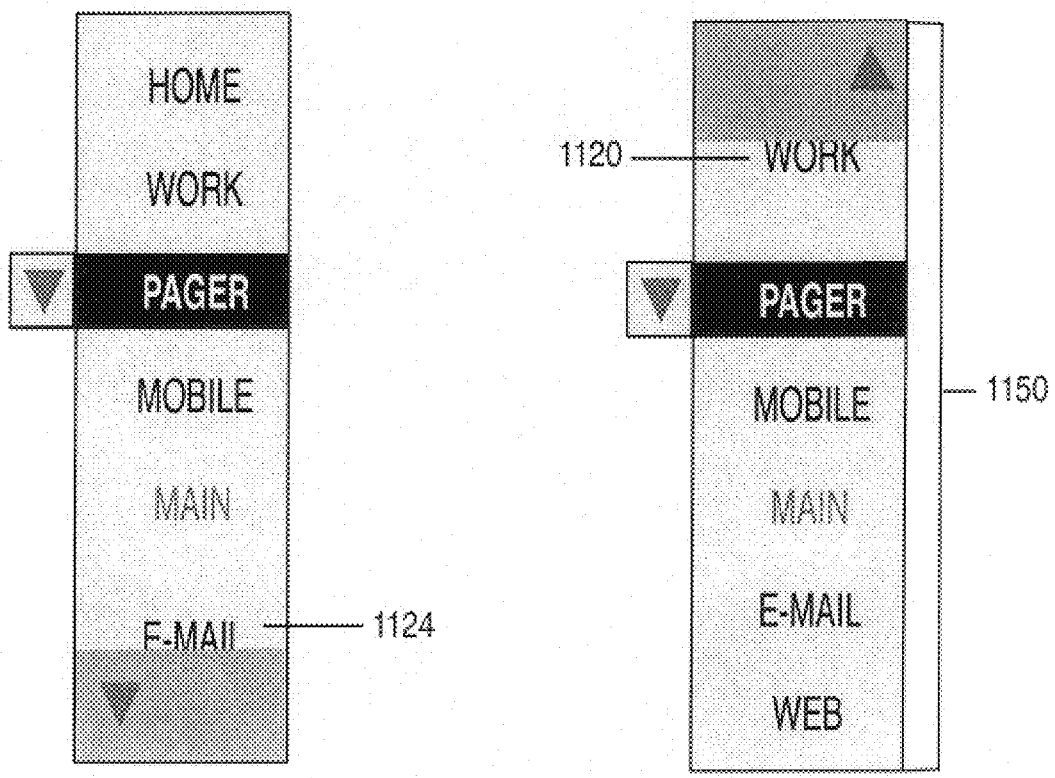

If the user scrolls the list all the way to the top the user is provided a different set of visual clues to indicate what direction the list 1150 can be scrolled. FIG. 11C illustrates how one embodiment of the present invention appears when the user scrolls to the top of the list 1150. At the top of the list, the up arrow disappears (effectively disabling the up arrow). This indicates to the user that it is not possible to scroll up. The partially visible field 1124 located at the bottom of the list is also a visual clue to the user.

If the user scrolls all the way to the bottom of the pop-up menu, the same visual clues provided when the user scrolled to the top are provided. The down arrow disappears, effectively disabling the down arrow. A partially visible field 1120 is present at the top of the list 1150. How the pop-up menu appears when it is scrolled to this position is illustrated in FIG. 11D.

Although the pop up menus have been described where the directional arrows disappear when the list is at the top or bottom, an alternate embodiment is contemplated where the arrows remain, but a blank space at the top or bottom of the list provides a visual clue that the top or bottom of the list has been reached.

Generating a Displayed List

Figure 12:
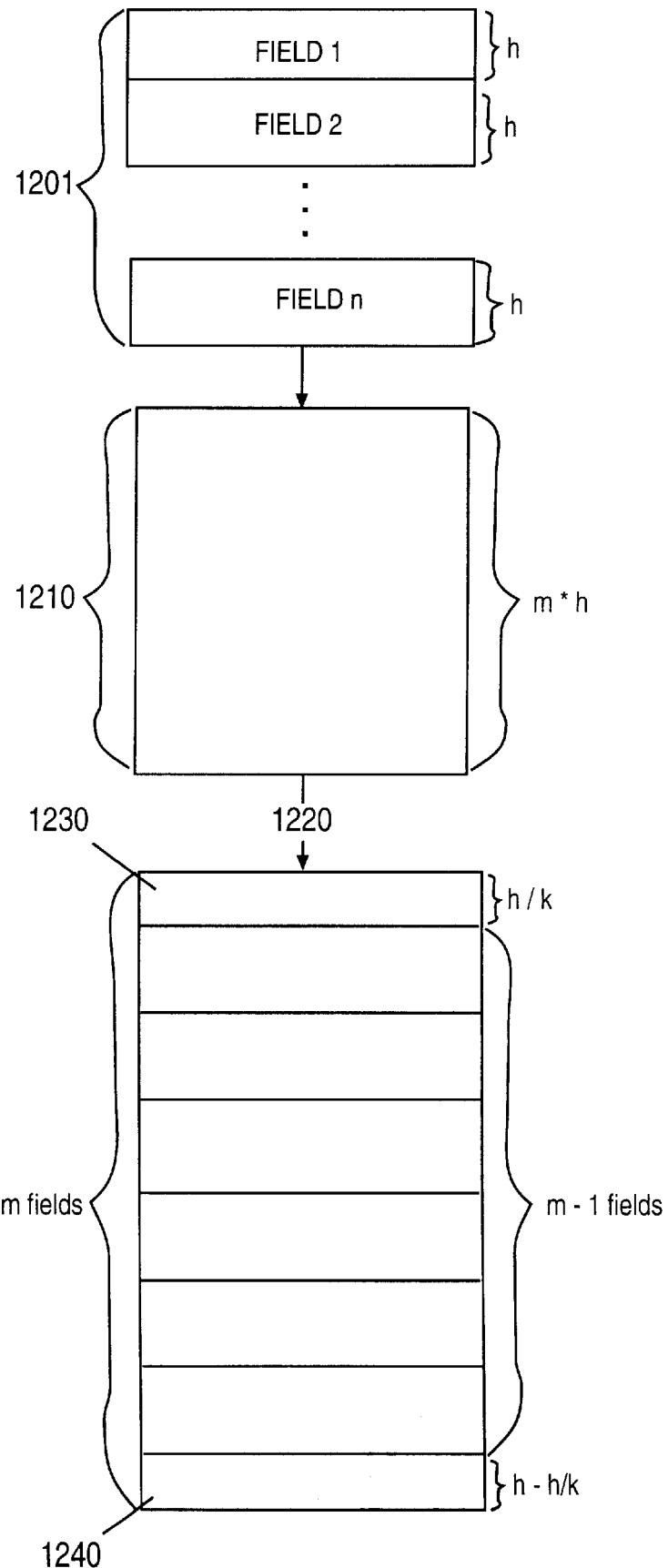
FIG. 12 illustrates the steps a developer may utilize to implement an embodiment of the invention in the form of a list.

FIG. 12 illustrates the steps a software developer may utilize to implement an embodiment of the invention in the form of a list. The example illustrated contemplates a list comprised of fields where each field has a height h. There are n number of fields and a display region where only m fields can be displayed where m<n. In one embodiment of the invention, the height of the visible display area is approximately m×h. Thus, there are more fields in the list than can be displayed at one time, so the list must be made scrollable.

Note that the limitation in the size of the display region may be a function of the environment in which the list is to be displayed. For example, the environment may include only a relatively small display screen, limiting display region size, or there may be a requirement for other display items to appear, limiting the display region available to the list. Examples of some display environments include a computer system, television menu system, telephone menu system, processor driven kiosk, internet telephone display, internet television system, video game menu display, video recorder display, or any other displayed data environment.

The display area 1210 is where the user views the visible portions of the list. As noted above, the total size of the list 1201 is larger than the display area, but the size of the display area 1210 is related to the dimensions of the fields.

Once a list 1201 comprising fields and the display area 1210 is created the developer then determines a blank region 1230 at the top of the display region after which the beginning of the list will be displayed. The blank region 1230 is derived from the field height h and is defined in one embodiment of the invention as h/k, where h is the field height (e.g. in pixels) and k is any positive number less than h. In one embodiment k is 2. Different values for k provide the user with blank regions of varying height. When k is greater than 1 the height of the blank region 1230 is less than the field height h.

The distance the list 1201 moves each time the user initiates a scroll command is equivalent to the height h of each field. The partially visible field 1240 at the bottom of the list shown in FIG. 12 has a height of h−h/k. (Note that the partially visible field 1240 can have a different height than the blank region 1230 depending on the value of k). In one embodiment, the combination of regions 1230 and 1240 has a height equal to h. However, this is not required, and the invention has equal application where the combination of regions 1230 and 1240 does not have a height equal to h. In an embodiment of the invention, regions 1230 and 1240 each individually have a height less than h.

Region 1230 is referred to as a blank region in this description. However, depending on the position of the list, region 1230 may be a blank region or it may be a partially visible region. Similarly, region 1240 is referred to as a partially visible region, but it may be a blank region depending on the position of the list.

If the display area 1210 is resized while the user is currently viewing an area of the list 1201 the size of the list 1201 can be recalculated dynamically. This can be done by increasing or decreasing the field height h of each field by the percentage that the display region changed.

By building in a blank region in the display region prior to the display of the first field, and by having the list increment by a distance equal to a field height h, partially visible fields will appear automatically at the top and bottom of the display region as the list is scrolled, without any processor overhead. These partially visible fields provide important feedback to the list user and are achieved without processor cost. At any one time, when the list is between the top and bottom, m−1 fully visible fields are displayed in the display region, along with a partially visible field of height h/k at the top of the display region, and a partially visible field of height h−h/k at the bottom of the display region.

The invention has been described where fields are the same height h. However, the invention can be implemented where not all fields have the same height. If the fields are not all the same height, processing is used to center fully visible fields in the visible region, with partially visible fields and/or blank spaces at the top and bottom of the visible region.

Operational Flow

Figure 13:
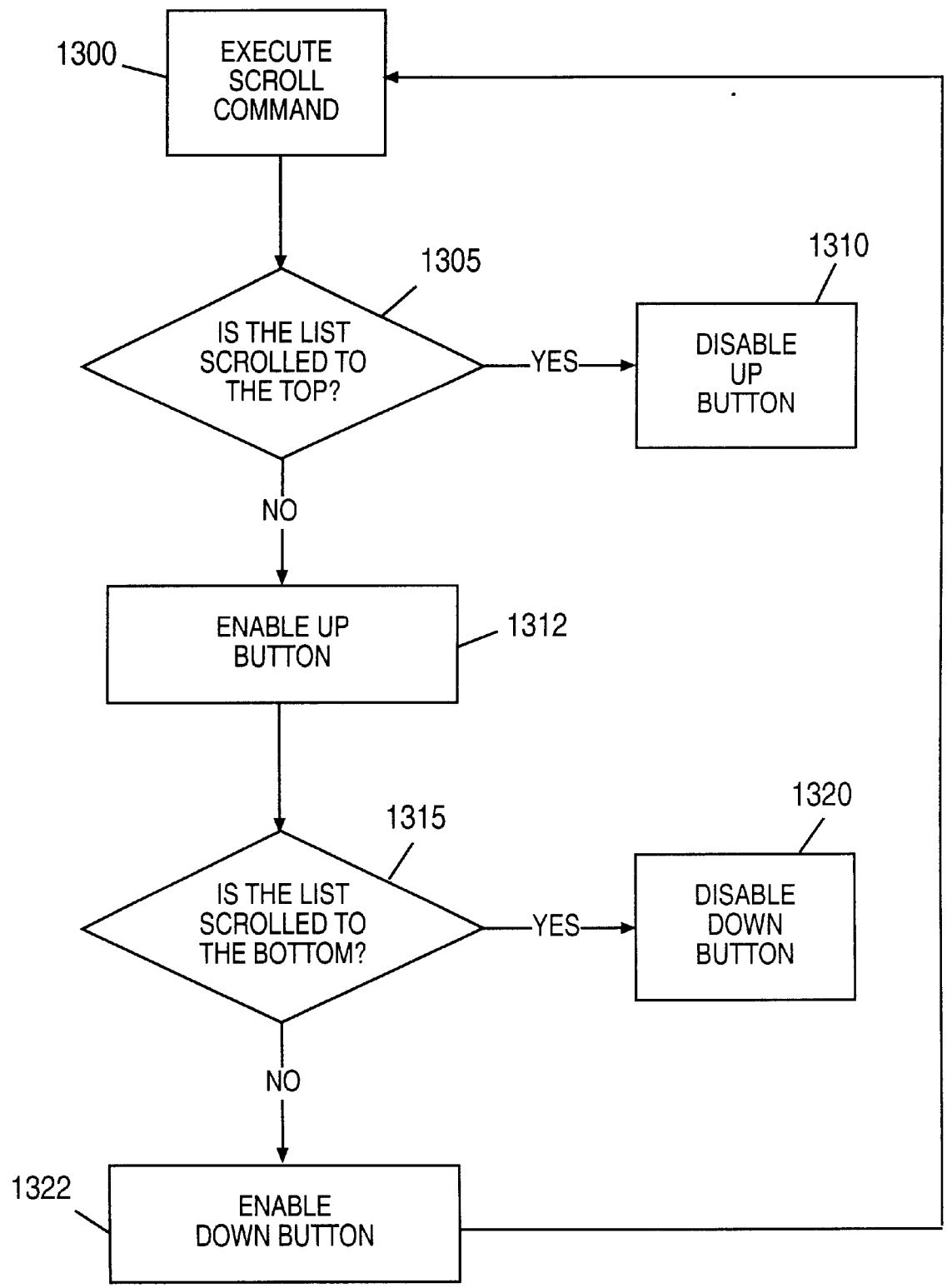
FIG. 13 is a flow chart illustrating a process used in one or more embodiments of the invention.

FIG. 13 is a flow chart illustrating a process for enabling and disabling the up and down buttons used in one or more embodiments of the invention. The process begins at step 1300 when a scroll command is executed. At step 1305 a determination is made as to whether the list is currently scrolled to the top. If the list is scrolled to the top then step 1310 is executed and the up button is disabled. If the list is not scrolled to the top, step 1312 is executed and the up button is enabled. At step 1315 a determination is made as to whether the list is scrolled to the bottom. If the list is currently scrolled to the bottom, the down button is disabled at step 1320. If the list is not scrolled to the top or the bottom of the list, the down button is enabled at step 1322.

Figure 14:
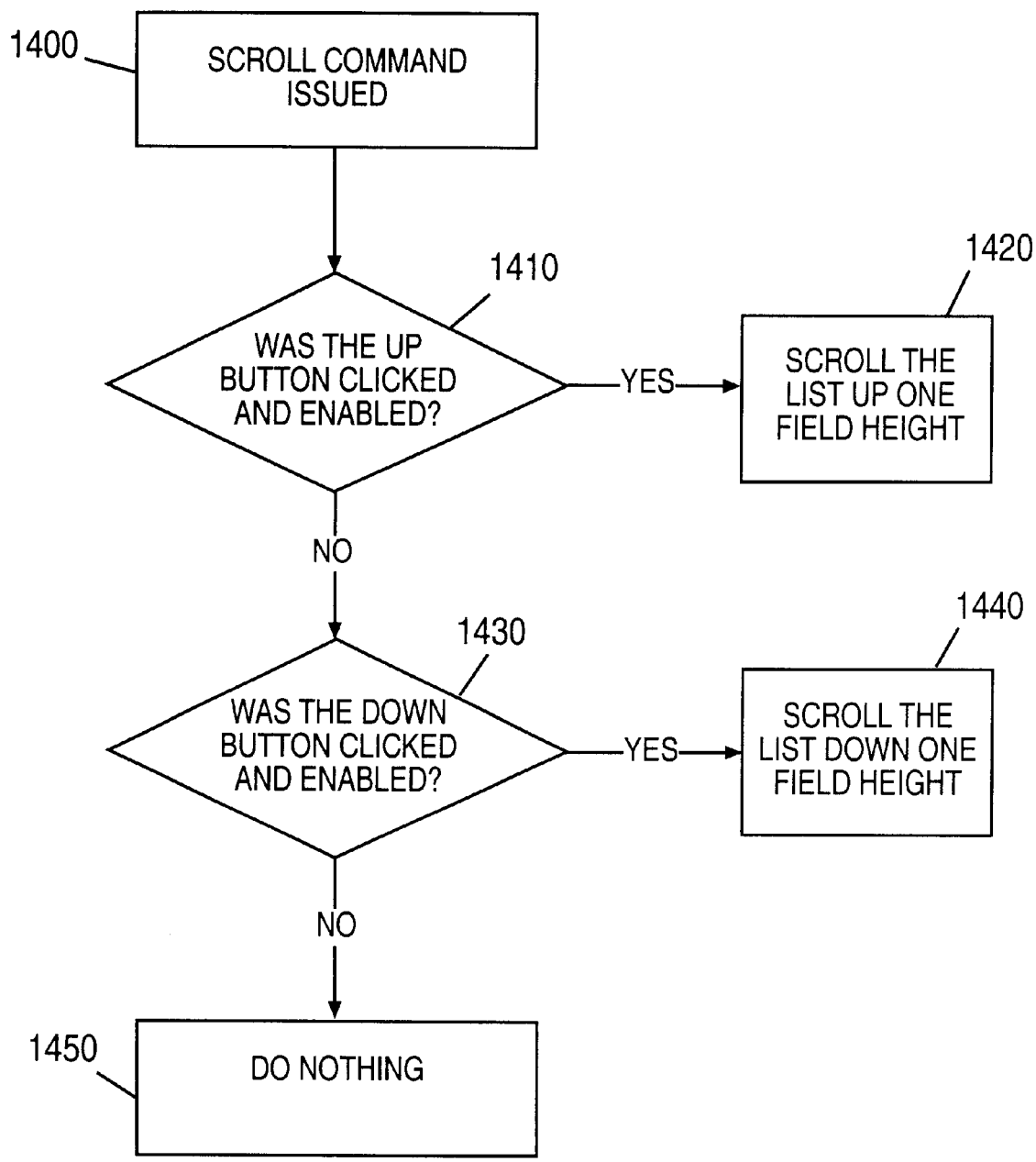
FIG. 14 illustrates how one embodiment of the invention responds to a scroll command issued by the user.

FIG. 14 illustrates how one embodiments of the invention responds to a scroll command issued by the user. At step 1400 a scroll command is issued. Once a scroll command is given the invention determines whether the command requires the list to be scrolled up or down. This determination is made by steps 1410 and 1430. If the up button is clicked and enabled the list is scrolled up at step 1420 the same distance as the field height h discussed in FIG. 12. If the up button is not clicked the invention checks at decision block 1430 to see if the down button is clicked. If the down button is clicked and enabled the list is scrolled down the distance of the field height h at step 1440. If neither the up or down button was clicked and enabled, the system does nothing at step 1450. Each time a scroll command is given the list moves the same distance. In one embodiment, the user may issue repeated scroll commands without pressing the button repeatedly, by merely holding the button down.

Embodiment of Computer Execution Environment (Hardware)

Figure 1:
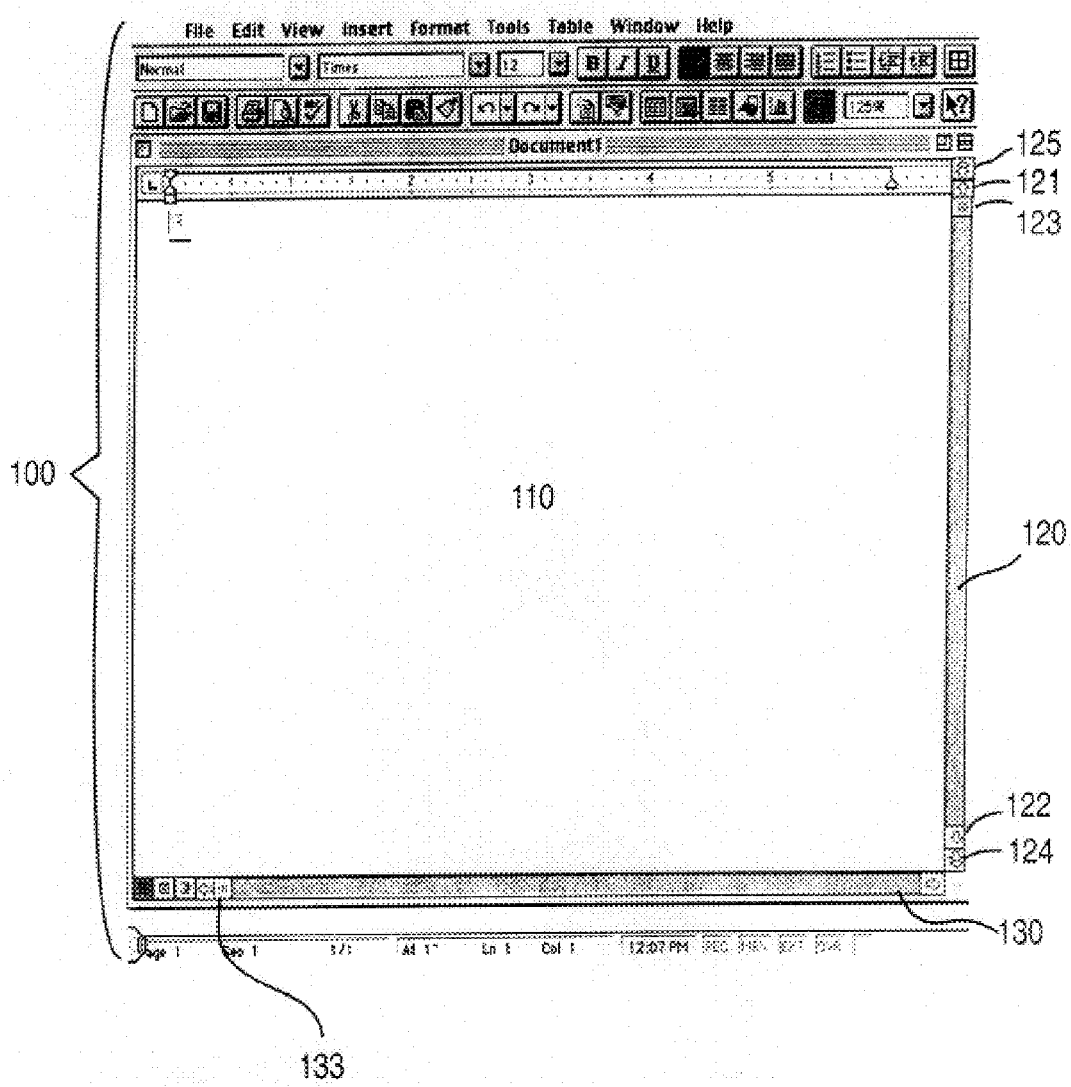
FIG. 1 illustrates an example of a prior art interface for scrolling a display area.
Figure 2:
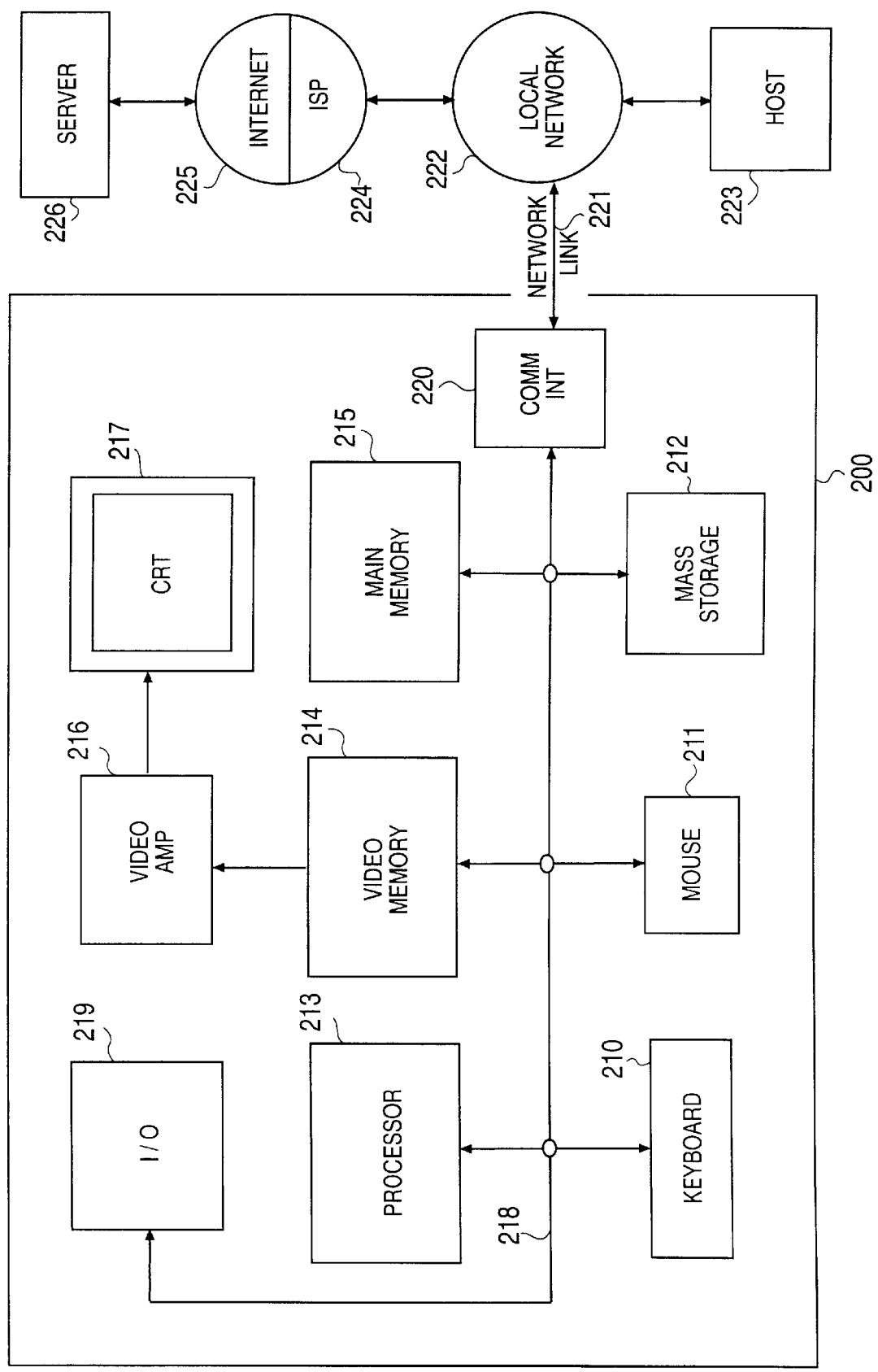
FIG. 2 is an example of a computer system that can be used to implement one or more embodiments of the invention.

An embodiment of the invention can be implemented as computer software in the form of computer readable program code executed on a general purpose computer such as computer 200 illustrated in FIG. 2. A keyboard 210 and mouse 211 are coupled to a bidirectional system bus 218. The keyboard and mouse are for introducing user input to the computer system and communicating that user input to processor 213. Other suitable input devices may be used in addition to, or in place of, the mouse 211 and keyboard 210. I/O (input/output) unit 219 coupled to bi-directional system bus 218 represents such I/O elements as a printer, A/V (audio/video) I/O, etc.

Computer 200 includes a video memory 214, main memory 215 and mass storage 212, all coupled to bi-directional system bus 218 along with keyboard 210, mouse 211 and processor 213. The mass storage 212 may include both fixed and removable media, such as magnetic, optical or magnetic optical storage systems or any other available mass storage technology. Bus 218 may contain, for example, thirty-two address lines for addressing video memory 214 or main memory 215. The system bus 218 also includes, for example, a 32-bit data bus for transferring data between and among the components, such as processor 213, main memory 215, video memory 214 and mass storage 212. Alternatively, multiplex data/address lines may be used instead of separate data and address lines.

In one embodiment of the invention, the processor 213 is a microprocessor manufactured by Motorola, such as the 680X0 processor or a microprocessor manufactured by Intel, such as the 80X86, or Pentium processor, or a SPARC™ microprocessor from Sun Microsystems™. However, any other suitable microprocessor or microcomputer may be utilized. Main memory 215 is comprised of dynamic random access memory (DRAM). Video memory 214 is a dual-ported video random access memory. One port of the video memory 214 is coupled to video amplifier 216. The video amplifier 216 is used to drive the cathode ray tube (CRT) raster monitor 217. Video amplifier 216 is well known in the art and may be implemented by any suitable apparatus. This circuitry converts pixel data stored in video memory 214 to a raster signal suitable for use by monitor 217. Monitor 217 is a type of monitor suitable for displaying graphic images.

Computer 200 may also include a communication interface 220 coupled to bus 218. Communication interface 220 provides a two-way data communication coupling via a network link 221 to a local network 222. For example, if communication interface 220 is an integrated services digital network (ISDN) card or a modem, communication interface 220 provides a data communication connection to the corresponding type of telephone line, which comprises part of network link 221. If communication interface 220 is a local area network (LAN) card, communication interface 220 provides a data communication connection via network link 221 to a compatible LAN. Wireless links are also possible. In any such implementation, communication interface 220 sends and receives electrical, electromagnetic or optical signals which carry digital data streams representing various types of information.

Network link 221 typically provides data communication through one or more networks to other data devices. For example, network link 221 may provide a connection through local network 222 to host computer 223 or to data equipment operated by an Internet Service Provider (ISP) 224. ISP 224 in turn provides data communication services through the world wide packet data communication network now commonly referred to as the "Internet" 225. Local network 222 and Internet 225 both use electrical, electromagnetic or optical signals which carry digital data streams. The signals through the various networks and the signals on network link 221 and through communication interface 220, which carry the digital data to and from computer 200, are exemplary forms of carrier waves transporting the information.

Computer 200 can send messages and receive data, including program code, through the network(s), network link 221, and communication interface 220. In the Internet example, server 226 might transmit a requested code for an application program through Internet 225, ISP 224, local network 222 and communication interface 220. In accord with the invention, one such downloaded application is the method and apparatus for providing feedback while scrolling described herein.

The received code may be executed by processor 213 as it is received, and/or stored in mass storage 212, or other non-volatile storage for later execution. In this manner, computer 200 may obtain application code by way of a carrier wave.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer system described above is for purposes of example only. An embodiment of the invention may. be implemented in any type of computer system or programming or processing environment including, but not limited to, an embedded system.

Thus, a method and apparatus for providing feedback while scrolling has been presented. Although the present invention has been described with respect to certain example embodiments, it will be apparent to those skilled in the art that the present invention is not limited to those specific embodiments. Further, although the operation of certain embodiments has been described in detail using certain detailed process steps, some of the steps may be omitted or other similar steps may be substituted without departing from the scope of the invention. Other embodiments incorporating the inventive features of the present invention will be apparent to those skilled in the art. The invention is defined by the claims and their full scope of equivalents.

What is claimed is:

1. A computer program product comprising:
 a computer usable medium having computer readable code embodied therein for configuring a computer, said computer program product comprising:
 computer readable code configured to cause a computer to define a display region;
 computer readable code configured to cause a computer to display at least one field of a list of n fields, where n is an integer;
 computer readable code configured to cause a computer to display a first blank region at a top end of said display region when a beginning of a first field of said list of n fields is displayed within said display region;
 computer readable code configured to cause a computer to display a second blank region at a bottom end of said display region when an end of a last field of said list of n fields is displayed within said display region;
 computer readable code configured to cause a computer to display a field k, from said list of n fields, where said field k is a first complete field at said top of said display region, where k is any integer between 2 and n;
 computer readable code configured to cause a computer to display a portion of a preceding field, k−1, from said list of n fields above said field k;
 computer readable code configured to cause a computer to display a field m, from said list of n fields, where said field m is a last complete field at said bottom of said display region, where m is any integer between 1 and n−1;
 computer readable code configured to cause a computer to display a portion of a subsequent field, m+1, from said list of n fields, below said field m;

computer readable code configured to cause a computer to display a first button associated with said first blank region;

computer readable code configured to cause a computer to display a second button associated with said second blank region;

computer readable code configured to cause a computer to displace said fields within said display region a distance in a first direction when said first button is clicked, and a distance in the opposite direction when a second button is clicked;

computer readable code configured to cause a computer to disable said first button when said first field of said list of n fields is displayed within said display region; and computer readable code configured to cause a computer to disable said second button when said last field of said list of n fields is displayed within said display region.

2. The computer product of claim 1, wherein the display region is comprised of a text box having editable fields.

3. The computer product of claim 1, wherein the display region is comprised of a popup-menu having selectable choice fields.

4. A computer program product comprising:

a computer usable medium having computer readable code embodied therein for configuring a computer, said computer program product comprising computer readable code configured to cause a computer to:

define a display region;

display at least one field of a list of n fields, where n is an integer;

display a first blank region at a top end of said display region when a beginning of a first field of said list of n fields is displayed within said display region;

display a first portion of a middle visible field from said list of n fields adjacent to a bottom edge of said display area;

display at least one middle field, in said display region, of said list of n fields;

display a second portion of a preceding field from said list of n fields, above said at least one middle portion;

display a third portion of a subsequent field from said list of n fields, below said at least one middle portion;

display a second blank region at a bottom end of said display region when an end of a last field of said list of n fields is displayed within said display region;

display a fourth portion of a middle visible field from said list of n fields adjacent to a top edge of said display region;

wherein h represents a height associated with each field in said list of n fields where said first, second, third and fourth portions are less than h;

display a first button associated with said first blank region;

display a second button associated with said second blank region;

displace said fields within said display region a distance in a first direction when said first button is clicked, and a distance in the opposite direction when a second button is clicked;

disable said first button when said first field of said list of n fields is displayed within said display region; and disable said second button when said last field of said list of n fields is displayed within said display region.

5. The computer product of claim 4, wherein the display region is comprised of a text box having editable fields.

6. The computer product of claim 4, wherein the display region is comprised of a popup-menu having selectable choice fields.

7. A method of configuring a computer to define a display region comprising the steps of:

defining a display region;

displaying at least one field of a list of n fields, where n is an integer;

display a first blank region at a top end of said display region when a beginning of a first field of said list of n fields is displayed within said display region;

displaying a first portion of a middle visible field from said list of n fields adjacent to a bottom edge of said display region;

displaying at least one middle field, in said display region, of said list of n fields;

displaying a second portion of a preceding field from said list of n fields, above said at least one middle portion;

displaying a third portion of a subsequent field from said list of n fields, below said at least one middle portion;

displaying a second blank region at a bottom end of said display region when an end of a last field of said list of n fields is displayed within said display region;

displaying a fourth portion of a middle visible field from said list of n fields adjacent to a top edge of said display area, wherein h represents a height associated with each field in said list of n fields where said first, second, third and fourth portions are less than h;

displaying a first button associated with said first blank region;

displaying a second button associated with said second blank region;

displacing said fields within said display region a distance in a first direction when said first button is clicked, and a distance in the opposite direction when a second button is clicked;

disabling said first button when said first field of said list of n fields is displayed within said display region; and disabling said second button when said last field of said list of n fields is displayed within said display region.

8. The method of claim 7, wherein the display region is comprised of a text box having editable fields.

9. The method of claim 7, wherein the display region is comprised of a popup-menu having selectable choice fields.

* * * * *